United States Patent
Hitchcock et al.

(10) Patent No.: US 11,641,425 B2
(45) Date of Patent: *May 2, 2023

(54) HANDLING AN OUTBOUND CALL REACHING A VOICEMAIL SERVICE

(71) Applicant: Noble Systems Corporation, Atlanta, GA (US)

(72) Inventors: Chad Hitchcock, Johns Creek, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,744

(22) Filed: Aug. 16, 2021

(65) Prior Publication Data
US 2021/0377393 A1    Dec. 2, 2021

Related U.S. Application Data

(63) Continuation of application No. 16/533,105, filed on Aug. 6, 2019, now Pat. No. 11,095,775.

(51) Int. Cl.
*H04M 3/533* (2006.01)
*G06N 20/00* (2019.01)
*H04M 3/42* (2006.01)

(52) U.S. Cl.
CPC ........ *H04M 3/53316* (2013.01); *G06N 20/00* (2019.01); *H04M 3/42382* (2013.01); *H04M 3/53383* (2013.01)

(58) Field of Classification Search
CPC ......... H04M 3/53316; H04M 3/42382; H04M 3/53383; H04M 7/1295; H04M 3/5158; H04M 3/493; H04M 3/53333; H04M 3/533; H04M 1/72403; H04M 3/42; G06N 20/00; G06N 20/10
See application file for complete search history.

(56) References Cited

U.S. PATENT DOCUMENTS

| | | | |
|---|---|---|---|
| 6,760,412 B1 * | 7/2004 | Loucks | H04M 3/42 379/207.03 |
| 7,162,027 B1 * | 1/2007 | Cannon | H04M 1/6505 379/382 |
| 9,185,225 B1 * | 11/2015 | Vance | H04M 11/10 |
| 9,966,072 B2 * | 5/2018 | Ruiz Rodriguez | G10L 15/26 |

(Continued)

*Primary Examiner* — Akelaw Teshale
(74) *Attorney, Agent, or Firm* — Blank Rome LLP

(57) ABSTRACT

Various embodiments of the invention provide methods, systems, and computer-program products for handling a call reaching a party's voicemail. A predictive model is used to generate a first probability of an outcome occurring as a result of leaving a voicemail message and a second probability of the outcome occurring as a result of sending a text message. If the first probability is greater, an IVR uses DTMF tone(s) to bypass a greeting on the voicemail so that a message can be recorded with minimal time. If the second probability is greater, the call is ended and an email is sent to the party's service provider using an email address comprising a mobile number for the party and a domain portion specific to the provider. As a result, the provider delivers a text message to the party with the body of the message including the content of the email.

21 Claims, 7 Drawing Sheets

(56) References Cited

U.S. PATENT DOCUMENTS

| | | | | |
|---|---|---|---|---|
| 2006/0031340 A1* | 2/2006 | Mathew | ................ | H04L 51/214 |
| | | | | 707/999.2 |
| 2008/0037554 A1* | 2/2008 | Vincent | ................ | H04L 51/214 |
| | | | | 370/395.42 |
| 2008/0247521 A1* | 10/2008 | Bi | .................... | H04M 3/53333 |
| | | | | 379/88.18 |
| 2011/0136464 A1* | 6/2011 | Blair | ....................... | B60D 1/62 |
| | | | | 455/412.2 |
| 2017/0070613 A1* | 3/2017 | Bloch | .............. | H04M 3/53333 |
| 2021/0377393 A1* | 12/2021 | Hitchcock | ......... | H04M 3/53383 |

* cited by examiner

HANDLING AN OUTBOUND CALL REACHING A VOICEMAIL SERVICE

CROSS REFERENCE TO RELATED APPLICATIONS

This application is a continuation of U.S. patent application Ser. No. 16/533,105, entitled, "Handling an Outbound Call Reaching a Voicemail Service", filed on Aug. 6, 2019, the contents of which is incorporated herein in its entirety.

BACKGROUND

A typical telecommunications service provider provides customers with telecommunication services such as telephony and data communications access. These telecommunications services may be provided to customers via a landline and/or wirelessly. Along with basic telecommunications services, many service providers also offer their customers other services in addition to basic telecommunications services. For instance, a commonly provided service is voicemail. Voicemail is a computer-based system that allows subscribers to exchange personal voice messages. The system enable a caller to leave a recorded message for a recipient (e.g., subscriber) when the recipient is unavailable to accept the caller's incoming call. Accordingly, the recipient can log into his or her voicemail and retrieve and listen to the recorded message left by the caller.

Contact centers originate telephone calls using telecommunications equipment commonly referred to as a "dialer." A dialer has the capability to originate a large number of telephone calls to various called parties and connect answered calls to available agents. The dialer processes a list of numbers to automatically dial, and upon detecting various conditions, handles the calls accordingly. For example, the dialer may be configured to connect a call answered by a live party with an agent while the dialer may be configured to abandon calls answered by a voicemail system or play a message to be recorded on the voicemail system.

With that said, many contact centers are charged by their service providers based on connect time. Therefore, every time a contact center places a call and that call is answered by something or someone other than the party who the center is trying to contact, the contact center incurs a cost. Furthermore, if the contact center decides to leave a voicemail message for the party in hopes of a returned call or having the party perform some desired action, the contact center may incur further connect time cost waiting for the party's voicemail to cycle through the greeting and reach the beep so that a message can be recorded.

Thus, a need in the industry exists for a more efficient manner in how dialers can handle a telephone call that has reaches a party's voicemail to minimize the amount of connect time for the call and still utilize the connect with the party to achieve an intended result. It is with respect to this and other considerations that the disclosure herein is presented.

BRIEF SUMMARY

In general, embodiments of the present invention provide computer-program products, methods, systems, apparatus, and computing entities for automatically handling a telephone call that has reached a voicemail service for a party without human intervention. A telephone call is placed to the party and upon reaching a voicemail service for the party while the telephone call is still connected, various embodiments of the invention involve using a predictive model to generate a first probability of an outcome of interest occurring as a result of leaving a voicemail message for the party on the voicemail service and a second probability of the outcome of interest occurring as a result of sending the party a text message. For instance, in particular embodiments, the predictive model is a support vector machine.

In response to the first probability being greater than the second probability, an interactive voice response component ("IVR") is connected to the telephone call. Here, in particular embodiments, the IVR is configured to look up one or more dual-tone multiple frequency ("DTMF") tones used to bypass a greeting message on the voicemail service based on the telecommunications service provider and provide the one or more DTMF tones over the telephone call to the voicemail service to bypass the greeting message. The IVR can then record the message once the greeting message has been bypassed and the IVR detects the voicemail service is ready to record. At that point, the telephone call is hung up.

However, in response to the second probability being greater than the first probability, the call is hung up and an email component is invoked. Here, the email component is configured to look up a domain portion of an email address that is specific for the telecommunications service provider. The email component then generates an email address comprising a mobile telephone number for the party and the domain portion. At that point, the email component sends an email using the email address with the appropriate content. As a result, the telecommunications service provider receives the email and delivers a text message to the party with the body of the text message comprising the content of the email.

In particular embodiments, a determination may be performed prior to using the predictive model as to whether the party has a preference to receiving a message on the party's voicemail service or receiving a text message. Accordingly, if the party does have a preference, then the preference is used in determining whether to leave a message on the party's voicemail service or sending the party a text message. Likewise, in particular embodiments, a determination may be performed prior to using the predictive module as to whether the telephone call has been placed to a wireless device. If not, then a message is left on the party's voicemail service. Similarly, in particular embodiments, a determination may be performed prior to using the predictive model as to whether the content to be delivered to the party is appropriate for a text message. If not, then a message is left on the party's voicemail service. Finally, in particular embodiments, a determination may be performed as to whether authorization has been provided by the party to send a text message. If not, then a message is left on the party's voicemail service.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
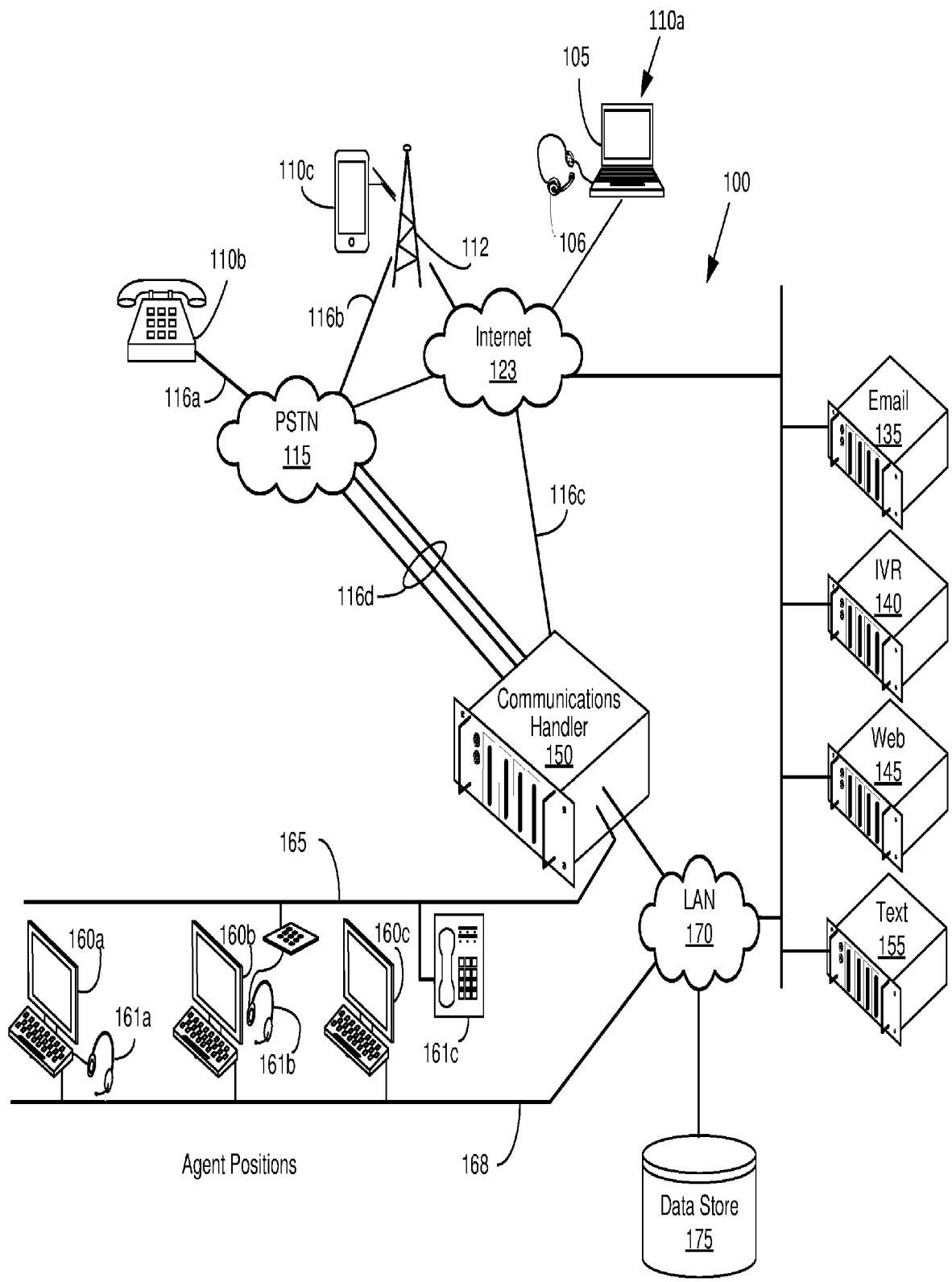
FIG. 1 illustrates a communication architecture used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, voice calls can originate from and/or placed to remote parties using a variety of different phone types. For instance, a remote party may originate or receive a call using a conventional analog telephone 110b connected to a public switched telephone network ("PSTN") 115 using an analog plain old telephone service ("POTS") line 116a. Here, the call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Voice calls may also originate or be received using a mobile phone device 110c, such as a smart phone, tablet, or other mobile device, which wirelessly communicates with a mobile service provider ("MSP") 112. The voice calls may be routed to or from the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") in conjunction with an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer various VoIP communication channels.

Voice calls may also originate from or be received by a remote party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a party at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 150, which could be, for instance, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 150.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, provided via a computer monitor. This is used to convey information to the agent about the calls, and the agent may interact with the communications handler 150 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 150 to allow the contact center (including the communications handler 150) to know which agents are available for handling calls. In particular embodiments, the communications handler 150 may also maintain data on an agent's skill level that may be used to route a specific call to the agent or group of agents having the same skill level. The communications handler 150 may also know what types of channels and combinations of channels the agent can handle.

Accordingly, in various embodiments, the communications handler 150 may place a call in a queue if there are no suitable agents available to handle the call, and/or the handler 150 may route the call to an interactive voice response system (e.g., server) ("IVR") 140 to play voice prompts. In particular embodiments, these prompts may be defined to be in a menu type structure and the IVR 140 may collect and analyze responses from the party in the form of dual-tone multiple frequency ("DTMF") tones and/or speech. In addition, the IVR 140 may be used to further identify the purpose of the call, such as, for example, prompting the party to enter account information or otherwise obtain information used to service the call. Further, in particular embodiments, the IVR 140 may interact with other components such as, for example, a data storage 175 to retrieve or provide information for processing the call. In particular instances, the IVR 140 may be used to provide announcements to a party or messages that are recorded by a party's voicemail.

In addition to receiving inbound communications, the contact center may also originate communications to parties, referred to herein as "outbound" communications. For instance, in particular embodiments, the communications handler 150 may also (or instead) be a dialer, such as a predictive dialer, that originates outbound calls at a rate designed to meet various criteria. Note that in particular embodiments, one or more components may make up the communications handler 150. Here, the communications handler 150 may include functionality for originating calls, and if so, this functionality may be embodied as a private automatic branch exchange ("PBX" or "PABX"). After the calls are originated, the communications handler 150 may perform a transfer operation to connect the calls with agents, a queue, or an IVR 140. Furthermore, in various embodiments, the communications handler 150 may make use of one or more algorithms to determine how and when to dial a list of numbers so as to minimize the likelihood of a called party being placed in a queue while maintaining target agent utilization.

As noted, the contact center may also receive and/or originate non-voice communications such as, for example, text messages (SMS (short message service) and/or MMS (multimedia messaging service)), emails, and chats. For instance, text messages may be received and/or originated over a MSP 112 and the Internet 123 by a text gateway server 155. Similarly, emails may be received and/or originated over the Internet 123 by an email server 135. While, in various embodiment, a remote party may participate in a chat with the contact center by accessing a website via a Web server 145.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 150 for conveying audio to the agents, other facilities 168 associated with the LAN 170 may be used.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Call Progress Module

Figure 2:
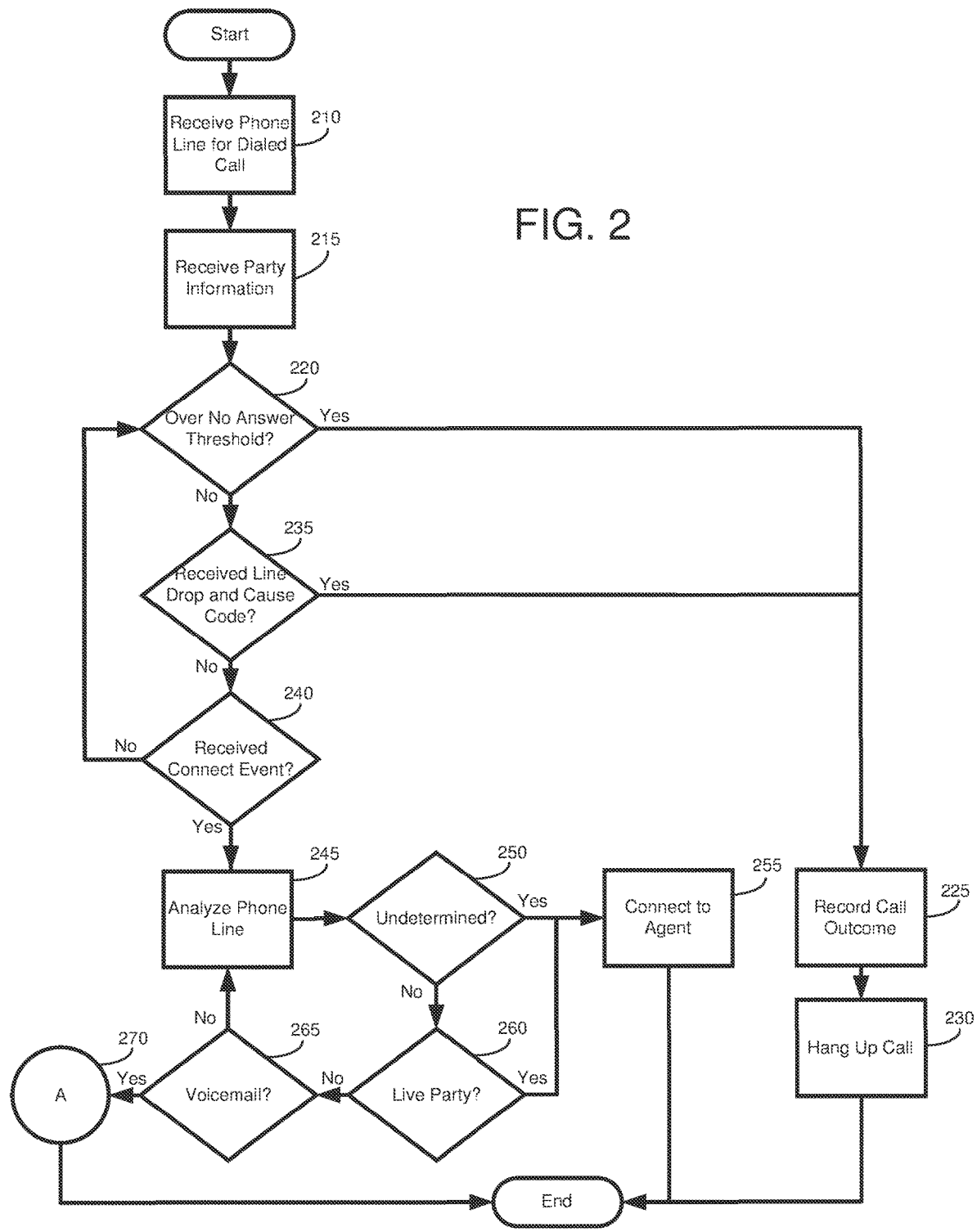
FIG. 2 illustrates a process flow for performing a call progress analysis for an outbound call in accordance with various embodiments of the invention.

Turning now to FIG. 2, additional details are provided regarding the process flow for performing a call progress analysis for an outbound call according to various embodiments of the invention. In particular, FIG. 2 is a flow diagram showing a call progress module for performing such functionality according to various embodiments of the invention. For example, the flow diagram shown in FIG. 2 may correspond to operations carried out by one or more processors in one or more components, such as, for example, the communications handler 150 described above, as it executes the call progress module stored in the component's volatile and/or nonvolatile memory.

Accordingly, the call hander 150 dials a telephone number to place an outbound call to a remote party. In turn, the call progress module begins the process by receiving a phone line for the dialed outbound call in Operation 210. At this point, the call progress module begins to listen in and analyze the audio received on the phone line to determine an outcome for the call. In addition, the call progress module receives information on the party that has been called in Operation 215. For instance, in particular embodiments, the information may have been queried from data storage located within or outside of the contact center. Here, this information on the party may provide different data on the party depending on the embodiment. For instance, as is discussed further herein, the information may indicate whether the party has a particular preference for being contacted and/or whether the party has provided consent to receiving particular types of communication such as text messages.

A first possible outcome for the call is a no answer condition in which the call continues to ring without someone or something picking up the call. Here, the call progress module is configured to wait a set number of rings before determining the outcome to the call is a no answer. However, with that said, in other embodiments the call progress module may be configured to wait a set duration of time without receiving a connect or disconnect event from the telecommunications service provider before reaching a determination that the outcome for the outbound call is a no answer condition.

For example, a ring cadence for a call may be considered to last for two seconds followed by four seconds of silence. Therefore, a single ring for a placed call is expected to last for six seconds. The contact center may set a threshold limit of thirty-six seconds (six rings) for determining the outcome to an outbound call to be a no answer condition. Thus, in this example, the call progress module determines in Operation 220 whether the outbound call has been ringing for over thirty-six seconds without receiving a connect or disconnect event from the telecommunications service provider. If so, then the call progress module determines the outcome to the outbound call is a no answer condition. Accordingly, the call progress module records the call outcome for the call in Operation 225 and hangs up the call in Operation 230. The call progress module may record the determined outcome of the call so that such information may be used for different purposes such as, for example, to help fine-tune the module. Therefore, additional information may be recorded along with the outcome such as, for instance, information on how the determination was reached for the call.

A second possible outcome for the call is the line is dropped and the call progress module receives a disconnect event from the telecommunications service provider. The primary reasons the call progress module may receive such an event from the telecommunications service provider is because the telephone number may be busy or the telephone number may be disconnected or inoperable. In addition, the telecommunications service provider may provide a cause code along with a disconnect event indicating the reason for the disconnect. For example, a cause code of seventeen may indicate a busy. Thus, the call progress module determines in Operation 235 whether it has received a disconnect event and associated cause code. If so, then similar to determining a no answer condition, the call progress module records the call outcome for the call in Operation 225 and hangs up the call in Operation 230.

Finally, a third possible outcome for the call is the call is connected because a live party or voicemail service has answered the call. Generally, the telecommunications service provider sends the call progress module a connect event indicating the call has been answered. Therefore, the call progress module determines in Operation 240 whether it has received a connect event from the telecommunications service provider. If not, then the call progress module returns to Operation 220 and repeats the process again for determining the outcome to the outbound call placed to the party. At some point, the call progress module makes a determination that the call has resulted in a no answer condition, has been dropped, or has been answered.

Therefore, if the call has been answered, the call progress module begins to analyze the phone line to attempt to determine whether a live party or a voicemail service has been reached in Operation 245. In various embodiments, the call progress module is configured to perform this particular operation by listening to the cadence of the audio provided on the phone line. That is to say, the call progress module is configured to listen for differences in noise versus non-noise provided in the audio.

For instance, when a live person answers a telephone call at a business, he or she typically speaks followed by an extended period of silence (non-noise). For example, a party may answer the call by stating "hello" followed by silence. Accordingly, the call progress module is listening to the audio on the call line and detects an initial burst of audio energy (the party's voice), followed by a minimum silence period. This break in cadence is indicative of a live person answering the call, and thus the call progress module concludes the call has been answered by a live party.

However, when the call progress module 210 encounters a voicemail service, the call progress module typically hears an initial burst of audio energy but does not hear an extended period of silence. For example, the greeting for a party's voicemail may state "Hello. I am not home right now but if you . . . " This time once the call progress module detects the initial burst of audio energy (the party's recorded greeting message), the call progress module typically detects a lack of cadence break, and thus concludes the call has been answered by a voicemail service, and not a live party.

Here, the call progress module analyzes the phone line and first makes a determination in Operation 250 as to whether it is undeterminable whether the call has reached a live party or a voicemail service. If so, then the call progress module may handle the call in different ways depending on the embodiment. For instance, in FIG. 2, the call progress module is configured to connect the call to an agent in Operation 255. Here, the contact center considers it important to have an agent handle the call if the call progress module is unable to determine whether the call has reached a live party or a voicemail service so that the contact center does not miss out on an opportunity to interact and speak with a live party if the call has in fact reached a live party. In other instances, the contact center may consider the agent's time (productivity of agents) to be of more importance over potentially missing some opportunities to speak with live parties and may only connect an agent to a call when the call progress module has made a positive determination that the call has reached a live party.

Secondly, the call progress module determines whether the call has reached a live party in Operation 260. If so, then the module connects the call with an agent in Operation 255. In addition, the call progress module may provide data to the agent's desktop who is fielding the call that may be helpful to the agent in fielding the call.

Lastly, the call progress module determines whether the call has reached a voicemail service in Operation 265. If so, then the call progress module 210 executes one or more actions to handle the call depending on circumstances (e.g., certain conditions) involving the call in Operation 270. For instance, in particular embodiments, the call progress module performs this operation by invoking a handle voicemail module. Accordingly, as is discussed further herein, the handle voicemail module determines what response should be carried out as a result of reaching the voicemail service, such as leaving a messaging on the service for example, and executing the response accordingly. At this point, the call progress module ends the process.

Handle Voicemail Module

Figure 3:
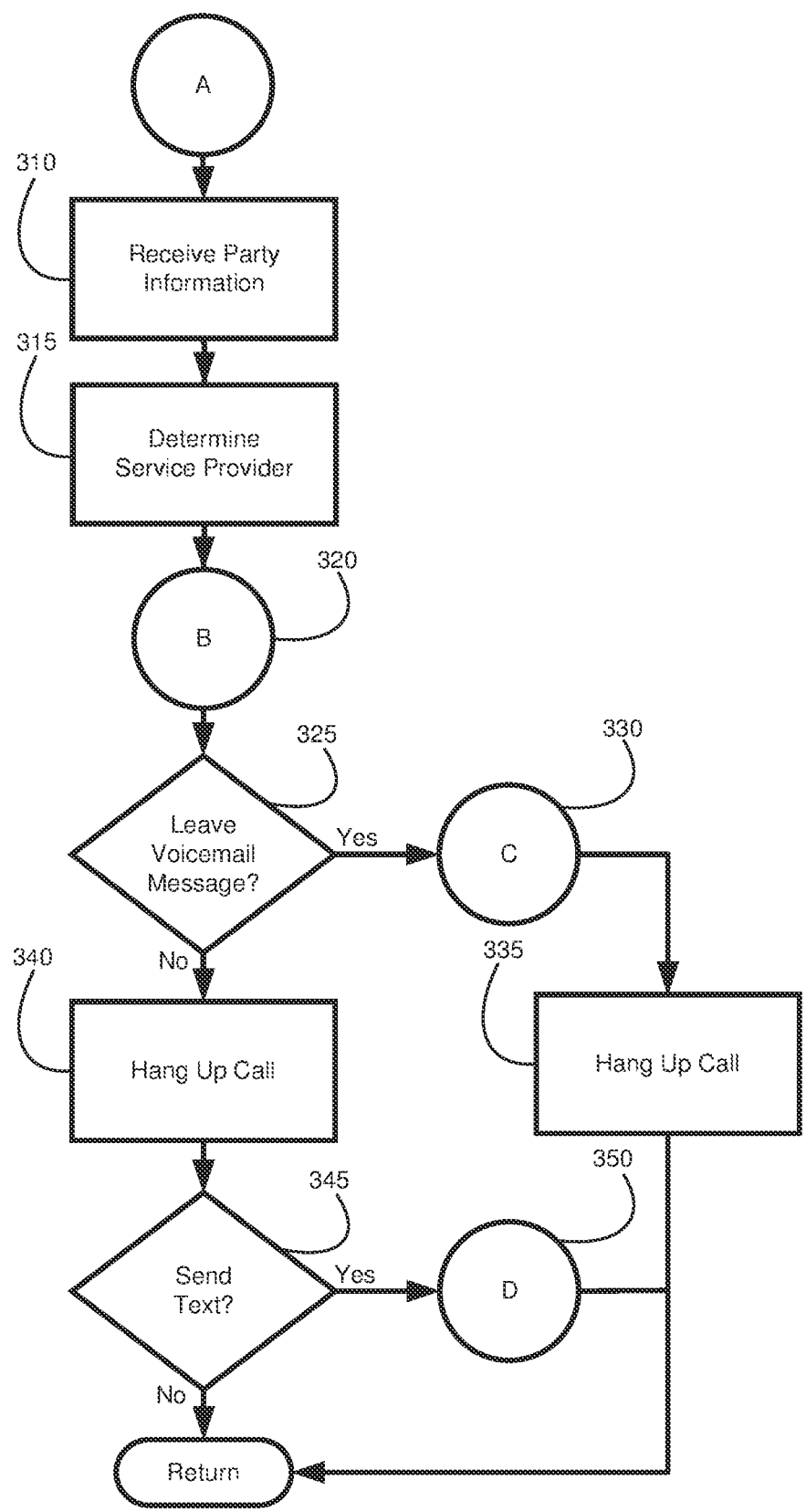
FIG. 3 illustrates a process flow handling an outbound call that has reached an answering service in accordance with various embodiments of the invention.

Turning now to FIG. 3, additional details are provided regarding the process flow for handling an outbound call that has reached a voicemail service according to various embodiments of the invention. In particular, FIG. 3 is a flow diagram showing a handle voicemail module for performing such functionality according to various embodiments of the invention. For example, the flow diagram shown in FIG. 3 may correspond to operations carried out by one or more processors in one or more components, such as, for example, the communications handler 150 described above, as it executes the handle voicemail module stored in the component's volatile and/or nonvolatile memory.

As the reader may recall, the handle voicemail module is invoked by the previously-discussed call progress module in various embodiments to handle a call that has been determined to have reached a voicemail service. However, with that said, in other embodiments, the handle voicemail module may be invoked by a different module or may be invoked as a stand-alone module.

Here, the process begins with the handle voicemail module receiving information on the party associated with the call in Operation 310. Depending on the embodiment, the handle voicemail module may receive the information on the party differently. For instance, in particular embodiments, the handle voicemail module may receive the information from a module such as the call progress module upon being invoked. While in other embodiments, the handle voicemail module may receive the information by querying the information from some data source, such as a database for example, located on some type of data storage found internally or externally from the contact center.

Next, the handle voicemail module determines the called party's telecommunications service provider in Operation 315. For instance, a number of third-party lookup services are available that can used to determine the service provider for the party based on the party's telephone number. In addition, these third-party services may also indicate whether the telephone number is associated with landline service or mobile service. For example, CarrierLookup.com is a company that provides a service to lookup the service provider for a given telephone number. CarrierLookup.com provides an application programming interface ("API") that allows for the integration of this service's functionality into a program module. Therefore, in this example, the handle voicemail module could make use of this API to determine the telecommunications service provider for the telephone number used to place the call that has reached an answering service.

Note that in particular embodiments, the party's telecommunications service provider may be determined prior to the call being placed to the party. Therefore, in these particular embodiments, the party's telecommunications service provider may be provided in the party's information and the handle voicemail module may simply retrieve the provider from this information in Operation 315.

At this point, the handle voicemail module determines how to handle the call that has reached the voicemail service in Operation 320. Here, the particular configuration of the handle voicemail module shown in FIG. 3 is configured to determine whether to leave a voicemail message or to instead, hang up the call and send the party a text message. Thus, the handle voice module performs this operation in various embodiments by invoking a decision module. In these particular embodiments, the decision module determines whether to leave a voicemail message or send a text message based on a number of different factors/considerations involving the call. For instance, as discussed in further detail herein, the decision module may consider preferences the called party has identified on whether the party would rather receive a voicemail message or a text message from the contact center.

Once the handle voicemail module determines how to handle the call, the module determines whether to handle the call by leaving a voicemail message in Operation 325. If so, then the handle voicemail module leaves a voicemail message for the party in Operation 330. Here, in particular embodiments, the handle voicemail module performs this operation by connecting an IVR 140 to the call. In turn, as is discussed further detail herein, the IVR 140 invokes a leave voicemail module in these particular embodiments and this module is configured to leave the voicemail message by using an approach that minimizes the amount of connect time the contact center experiences on the call. As a result, the communications handler 150 operations in a more efficient manner than if configured in a conventional manner and at a minimal amount of cost to the contact center. Once the IVR 140 has recorded the voicemail message, the handle voicemail module hangs up the call in Operation 335 and the process ends.

However, if the handle voicemail module determines a message should not be left on the party's voicemail, then the handle voicemail module determines whether a text message should be sent to the party. Here, the handle voicemail module first hangs up the call in Operation 340. Since a message is not being left on the party's voicemail, the call is terminated to minimize the amount connect time for the call. Next, the handle voicemail module determines whether a text message should be sent to the party in Operation 345. If so, then the handle voicemail module sends the party a text message in Operation 350.

The handle voicemail module performs this operation in various embodiments by invoking an email server 135. In turn, as is discussed in further detail herein, the email server 135 invokes a send text message module in particular embodiments and this module is configured to send the party a text message without incurring any additional connect time for the contact center. As a result, the contact center for these particular embodiments is able to send the party a text message in many instances without incurring any cost.

If the handle voicemail module determines a text message should not be sent to the party, then the process simply ends for the configuration of the handle voicemail module shown in FIG. 3. However, the handle voicemail module may be configured in other embodiments to further consider other actions that can be taken to handle the call. For instance, in particular embodiments, the handle voicemail module may be configured to consider whether an email should be sent to the party if the module determines a text message is inappropriate. Those of ordinary skill the art may recognize other options the handle voicemail module may be configured to further consider in other embodiments in light of this disclosure.

Decision Module

Figure 4:
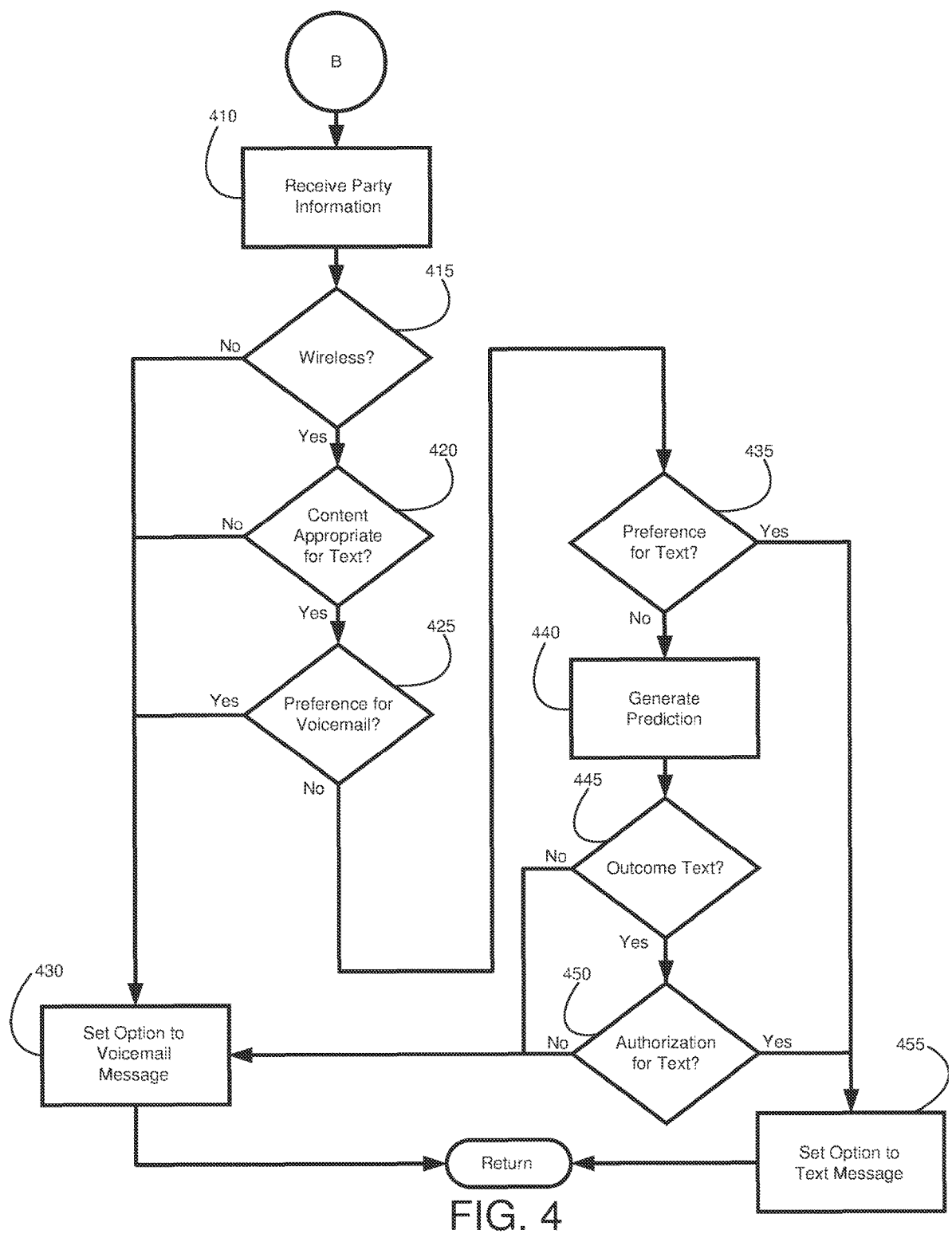
FIG. 4 illustrates a process flow for determining how to handle an outbound call that has reached an answering service in accordance with various embodiments of the invention

Turning now to FIG. 4, additional details are provided regarding the process flow for determining how to handle an outbound call that has reached a voicemail service according to various embodiments of the invention. In particular, FIG. 4 is a flow diagram showing a decision module for performing such functionality according to various embodiments of the invention. For example, the flow diagram shown in FIG. 4 may correspond to operations carried out by one or more processors in one or more components, such as, for example, the communications handler 150 described above, as it executes the decision module stored in the component's volatile and/or nonvolatile memory.

As the reader may recall, the decision module is invoked by the previously-discussed handle voicemail module in various embodiments to determine how to handle a call that has reached a voicemail service. However, with that said, in other embodiments, the decision module may be invoked by a different module or may be invoked as a stand-alone module.

The process begins with the decision module receiving information on the party in Operation 410. Similar to the handle voicemail module, the handle voicemail module may receive the information on the party differently depending on the embodiment. For instance, in particular embodiments, the decision module may receive the information from a module such as the handle voicemail module upon being invoked. While in other embodiments, the decision module may receive the information by querying the information from some data source, such as a database for example, located on some type of data storage found internally or externally from the contact center.

Next, the decision module determines whether the telephone number called is a wireless number in Operation 415. In many instances, the information identifying the service provider for the number that was queried may also identify whether the provider is providing landline or mobile service. Therefore, in these instances, the decision module may consider this information in making a determination as to whether the number is wireless or not. However, if the queried information identifying the service provider does not also identify whether the number is wireless or not, other third-party services are available that specifically identify whether a number is a landline number or wireless number such as, for example, Neustar and Nalennd. Therefore, in these instances, the decision module may be configured to query one of these third-party services.

If the decision module determines the number is a wireless number, then the decision module determines whether the content that is to be conveyed to the party is appropriate for a text message in Operation 420. For instance, the contact center may be trying to contact the party to solicit a donation for an organization the party has supported in the past. Here, the content of the message may be asking whether the party would consider supporting the organization again by making another donation. Further, the content may include a link to a website the party can visit to make a donation. Therefore, in this instance, the subject matter and length of the message may be considered appropriate for a text message. However, there may be instances in which the subject matter may not be appropriate for a text message and/or the amount of information to convey may be too much for an appropriately sized text message.

If the decision module determines the content is appropriate for a text message, then decision module determines whether the party may have a preference of receiving a voicemail message over a text message in Operation 425. Such a preference may be identified in the information received for the party. For instance, the contact center may have been in contact with the party previously and during the previous contact, the party may have indicated his or her preference for receiving a voicemail message over a text message. Accordingly, the contact center may have recorded the party's preference at that time.

Thus, if the decision module determines the number is not wireless, the content is not appropriate for a text message, or the party prefers to receive a voicemail message, then the decision module sets the option to handle the call to leaving a voicemail message in Operation 430. Therefore, as a result, the contact center handles the call by leaving a message on the party's voicemail.

However, if the number is wireless, the content is appropriate for a text message, and the party does not prefer to receive a voicemail message, then the decision module determines whether the party prefers to receive a text message in Operation 435. If so, then the decision module sets the option to handle the call to sending a text message in Operation 455. Accordingly, the contact center handles the call by sending a text message to the party.

However, if the party does not have a preference for either a voicemail message or a text message, then the decision module in various embodiments is configured to generate a prediction as to which option, leaving a voicemail message or sending a text message, is more likely to be effective for the call in Operation 440. Therefore, in particular embodiments, the decision module may be configured with some type of predictive capabilities for determining which option should be used for the call. That is to say, in particular embodiments, the decision module may be configured to use some type of predictive modeling/machine learning to achieve such predictive capabilities.

Generally speaking, machine learning is concerned with the construction and study of systems (e.g., computers) that can learn from data. The core of machine learning deals with representation and generalization. That is to say, a core objective of a learning machine is to generalize from its experience. Generalization is the ability of the learning machine to perform accurately on new, unseen instances after having experienced a training data set comprising instances with known outcomes. Thus, a learning machine focuses on providing predictions based on known properties learned from a training data set.

Several types of learning machines (machine learning algorithms) exist and may be applicable with respect to embodiments of the invention. For instance, a decision tree uses a tree-like graph or model of decisions (flowchart-like structure) to map observations about an item to conclusions about the item's target value. In general, the flowchart-like structure is made up of internal nodes representing tests on attributes and branches flowing from the nodes representing outcomes to these tests. The internal nodes and branches eventually lead to leaf nodes representing class labels. Accordingly, a path from a root to a leaf represents classification rules.

Another type of learning machine is an artificial neural network. An artificial neural network is a learning algorithm inspired by the structure and functional aspects of biological neural networks. Computations are structured in terms of an interconnected group of artificial neurons, processing information using a connectionist approach to computation. Artificial neural networks are typically used to model complex relationships between inputs and outputs to find patterns in data or to capture a statistical structure in an unknown joint probability distribution between observed variables.

There are numerous other types of learning machines that may be utilized by various embodiments of the decision module, such as Bayesian networks, clustering, and reinforcement learning to name a few, that one of ordinary skill in the art may make use of with respect to various embodiments of the invention. For instance, particular embodiments of the decision module utilize the type of learning machine known as a support vector machine (SVM).

SVMs are generally a set of related supervised learning methods that can be used for classification purposes. That is to say, SVMs are generally used to classify an instance into one class or another. Given a set of training examples, each marked as belonging to one of two categories (e.g., classes), a SVM training algorithm builds a model that predicts whether a new sample falls into one of the two categories. This model is a representation of the examples as points in space (a hyper plane), mapped so that the examples of the separate categories are divided by a clear gap that is as wide as possible. Accordingly, new examples can be mapped into the same space and predicted to belong to either category based on which side of the gap they fall on.

With that said, it is often the case that the data for a particular classification problem is not linear and therefore, a separating hyper plane cannot be found to separate the training examples. Accordingly, in these instances, a kernel function may be used to non-linearly map the data to a high-dimensional space that is linearly separable. In essence, this kernel function represents a dot product of the data after performing a non-linear mapping on the data. That is to say, a suitable function that corresponds to a dot product of some non-linear mapping on the data (a kernel function) is used instead of the dot product itself. In many instances, the appropriate kernel function to use for a particular classification problem is selected via trial and error.

Accordingly, various embodiments of invention involve developing a SVM model for predicting which option (e.g., classification) is better in achieving an outcome of interest for the call. For instance, returning to the charity solicitation example, a SVM model may be developed to predict whether a party who the contact center has attempted to contact to solicit a donation for the charity is more likely to actually make a donation to the charity if a voicemail message is left for the party or if a text message is sent to the party. The SVM model is developed using past telephone calls involving similar subject matter that had reached a voicemail service in which characteristics are extracted from the past telephone calls to train the SVM model to predict which option should be used for a particular call.

Once the SVM model has been developed and the accuracy of the models is acceptable, the SVM model may then be applied to present telephone calls that have reached a voicemail service to determine which option should be used. For instance, returning to the example, the SVM model may then be applied to a present telephone call that was made to solicit a donation from a party and has reached the party's voicemail to determine whether the party is more likely to make the donation to the charity if a message is left on the party's voicemail or if a text message is sent to the party.

At this point, the decision module determines whether the outcome of the prediction indicates sending a text message to the party is a better option (e.g., has a higher probability to produce the desired result) over leaving the party a voicemail message in Operation 445. If the answer is yes, then the decision module determines whether the contact center has authorization from the party to send a text message to the party in Operation 450. This operation in performed in various embodiments because in many instances, a contact center is required to have authorization (permission) from a party to send the party a text message. If the contact center has authorization, then the decision module sets the option to handle the call to sending a text message in Operation 455. However, if the contact center does not have authorization to send the party a text message, then the decision module sets the option to handle the call to leaving a voicemail message in Operation 430. At this point, the process ends.

Leave Voicemail Module

Figure 5:
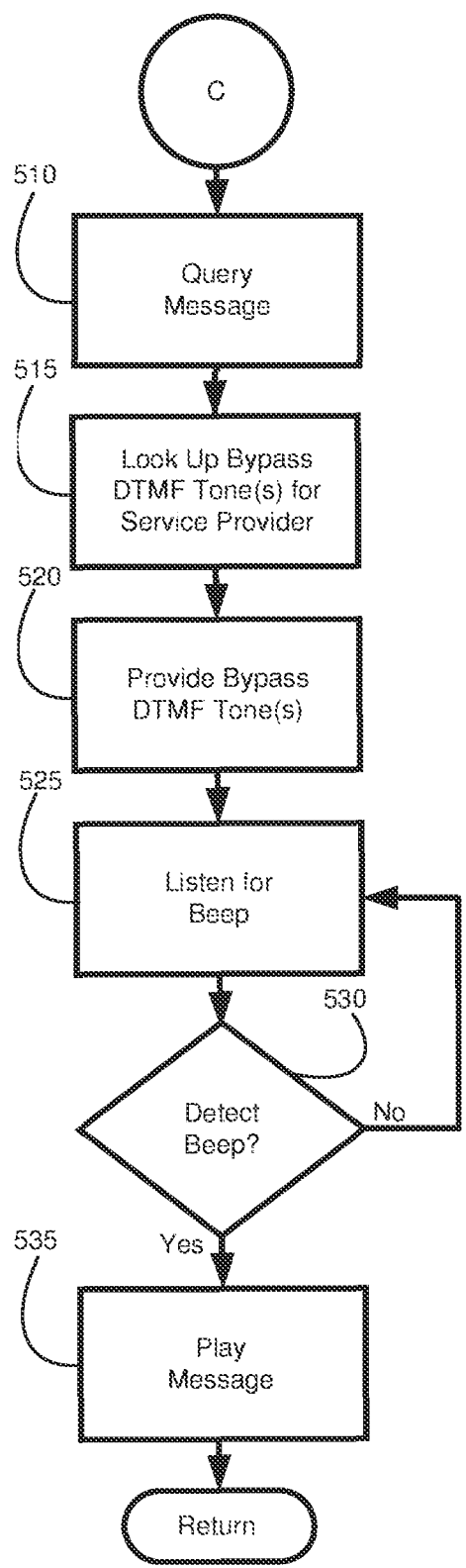
FIG. 5 illustrates a process flow for leaving a message on an answering service in accordance with various embodiments of the invention.

Turning now to FIG. 5, additional details are provided regarding the process flow for leaving a party a voicemail message for an outbound call that has reached the party's voicemail service according to various embodiments of the invention. In particular, FIG. 5 is a flow diagram showing a leave voicemail module for performing such functionality according to various embodiments of the invention. For example, the flow diagram shown in FIG. 5 may correspond to operations carried out by one or more processors in one or more components, such as, for example, the IVR 140 described above, as it executes the leave voicemail module stored in the component's volatile and/or nonvolatile memory.

As the reader may recall, a decision is made for a call that has reached a party's voicemail service in various embodiments as to whether to leave the party a voicemail message or instead, send the party a text message. Therefore, in various embodiments, the leave voicemail module is invoked as a result of the previously-discussed handle voicemail module connecting the IVR 140 to the call in response to determining to leave the party a voicemail message. However, in other embodiments, the leave voicemail module may be invoked as a result of the IVR 140 being connected to the call by a different module, or may be invoked as a stand-alone module.

The reader may also recall that an object of various embodiments of the invention is to try and minimize the amount of connect time for a call that has reached a voicemail service, while still trying to utilize the call for its intended purpose. Therefore, in various embodiments, the leave voicemail module is configured to streamline the process for leaving the voicemail message by skipping the party's voicemail greeting to immediately jump ahead to leaving a message.

Different telecommunications service providers have developed voicemail services with different functionality. However, the majority of these providers have functionality that allows a caller to enter one or more DTMF tones to bypass a party's greeting message to the beep so that a message can be left without having to wait through the greeting. Therefore, various embodiments of the leave voicemail module make use of this functionality to minimize connect time when leaving a party a message on their voicemail.

However, the one or more DTMF tones required to bypass the greeting message are typically different for different service providers. For example, the DTMF tone required to bypass the greeting message is * for the service provider Verizon, while the DTMF tone required to bypass the greeting message is # for the service provider AT&T. Therefore, the leave voicemail module must consider the party's service provider to determine what DTMF tone(s) are required to use the bypass option.

Looking now to FIG. 5, the process begins with the leave voicemail module querying the message that is to be left on the party's voicemail in Operation 510. Depending on the embodiment, the leave voicemail module may query the message from any one of a number of different sources, such as a database found on data storage located within or remotely from the contact center for example. Here, in particular embodiments, the leave voicemail module may be provided with information (some type of indicator) identifying the message so that it may be queried from the source.

Next, the leave voicemail module looks up the bypass DTMF tone(s) for the party's service provider in Operation 515. Again, depending on the embodiment, the leave voicemail module may query the bypass DTMF tone(s) from any one of a number of different sources. For instance, the contact center may maintain a list of service providers along with their bypass DTMF tone(s) and the leave voicemail module looks up the party's particular service provider on this list to obtain that provider's bypass DTMF tone(s).

Once the leave voicemail module has retrieve the bypass DTMF tone(s), the module provides the DTMF tone(s) over the call to initiate the bypass of the party's voicemail greeting in Operation 520. The leave voicemail module then listens for the beep in Operation 525, indicating that a message can be recorded on the party's voicemail. Accordingly, the leave voicemail module determines whether the beep has been detected in Operation 530. If not, then the leave voicemail module continues to listen. However, if the beep is detected, then the leave voicemail module plays the message over the call to be recorded on the party's voicemail in Operation 535. Once the message has been played, the process ends.

Send Text Module

Figure 6:
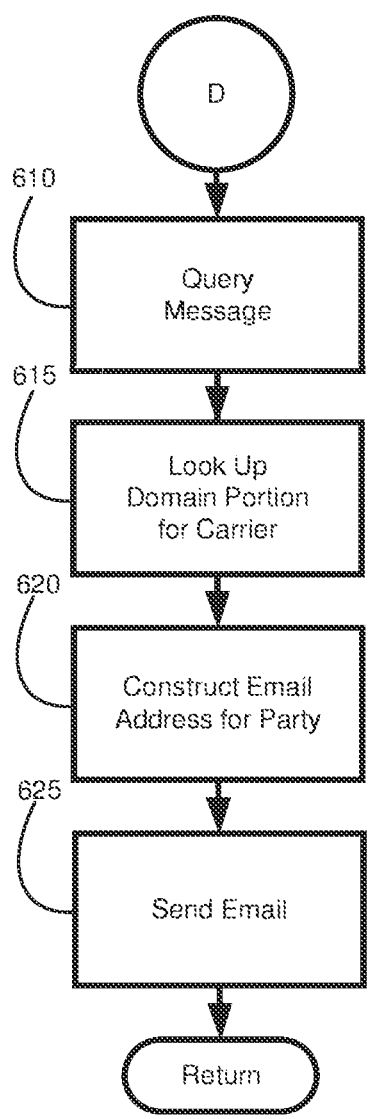
FIG. 6 illustrates a process flow for sending a text message to a party in accordance with various embodiments of the invention.

Turning now to FIG. 6, additional details are provided regarding the process flow for sending a party a text message in response an outbound call that has reached the party's voicemail service according to various embodiments of the invention. In particular, FIG. 6 is a flow diagram showing a send text module for performing such functionality according to various embodiments of the invention. For example, the flow diagram shown in FIG. 6 may correspond to operations carried out by one or more processors in one or more components, such as, for example, the email server 135 described above, as it executes the send text module stored in the component's volatile and/or nonvolatile memory.

As previously noted, a decision is made for a call that has reached a party's voicemail service in various embodiments as to whether to leave the party a voicemail message or instead, send the party a text message. Therefore, in various embodiments, the send text module is invoked as a result of the previously-discussed handle voicemail module invoking the email server 135 in response to a decision to send the party a text message. However, in other embodiments, the send text module may be invoked as a result of the email server 135 being invoked by a different module, or may be invoked as a stand-alone module.

Many telecommunications service providers support a capability that allows for a party (e.g., a contact center) to send another party a text message by sending an email. This capability is typically invoked by sending an email to a specific email address associated with the party's service provider. For instance, if the party's service provider is Verizon, a text message can be sent to the party by composing an email and using the party's mobile phone number as the local portion of an email address, with the addition of "@vtext.com" as the domain portion at the end. For example, the party's mobile phone number may be 555-123-4567. Here, a text message can be sent to the party's mobile phone by sending an email addressed to "5551234567@vtext.com."

The use of this capability is typically free for the sender. Furthermore, the use of this capability does not require the sender to incur any connect time. Therefore, this capability supports the object of various embodiments of the invention to attempt to minimize the amount of connect time for a call that has reached a voicemail service, while still trying to utilize the call for its intended purpose.

Looking now to FIG. 6, the process begins with the send text module querying the message that is to be sent as a text message to the party's mobile device in Operation 610. Similar to the leave voicemail module, the send text module may query the message from any one of a number of different sources. Here, in particular embodiments, the send text module may be provided with information (some type of indicator) identifying the message so that it may be queried from the source.

Next, the send text module looks up the domain portion of the email address for the party's service provider in Operation 615. Again, depending on the embodiment, the send text module may query the domain portion from any one of a number of different sources. For instance, the contact center may maintain a list of service providers along with their domain portion and the send text module looks up the party's particular service provider from this list to obtain that provider's domain portion of the email address.

At this point, the send text module constructs the email using the queried message, the party's mobile phone number, and the domain portion of the email address for the provider in Operation 620. Accordingly, the queried message makes up the body of the email and the combination of the party's mobile phone number and domain portion for the provider makes up the email address. Thus, the send text message then sends the email to the constructed email address in Operation 625. As a result, the party's service provider receives the email at a text gateway and the email is converted and sent as a text message to the party's mobile device.

Exemplary Computer Processing System

Figure 7:
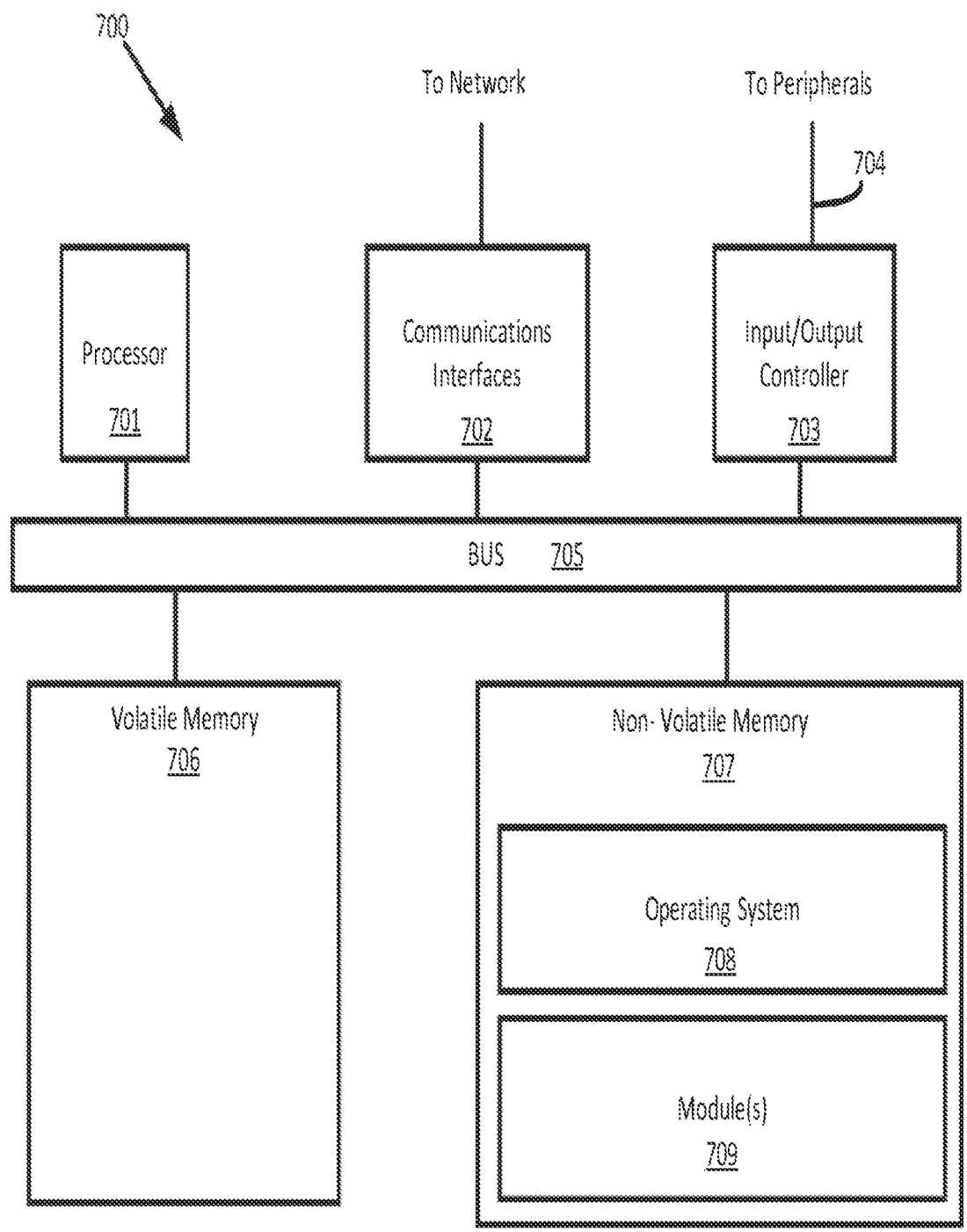
FIG. 7 illustrates an embodiment of a processing device for practicing various technologies and concepts disclosed herein.

FIG. 7 is an exemplary schematic diagram of a computer processing system that may be used in embodiments of various architectures, such as architecture 100 shown in FIG. 1, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 710 that may communicate with other elements within the processing system 700 via a bus 705. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via a network 170 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. For example, the non-volatile memory 707 may store one or more modules 709 that may perform the above-mentioned process flows and/or operating system code 708 containing instructions for performing the process and/or functions associated with the technologies disclosed herein. The module(s) 709 may also access, generate, or store related data, including, for example, the data described above in conjunction with a party who had been called, in the non-volatile memory 707, as well as in the volatile memory 706. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701 and may form a part of, or may interact with, the module(s) 709.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for automatically leaving a voicemail message, comprising:
    determining a particular telecommunications service provider associated with a telephone number;
    originating a call to the telephone number;
    determining a voicemail service has answered the call;
    connecting an interactive voice response unit ("IVR") to the call;
    determining, by the IVR, one or more dual-tone multiple frequency ("DTMF") tones associated with the particular telecommunications service provider, wherein the one or more DTMF tones are used to terminate a greeting message provided by the voicemail service;
    providing the one or more DTMF tones to the voicemail service on the call to bypass the greeting message;
    playing a voicemail message on the call; and
    terminating the call after playing the voicemail message.

2. The method of claim 1, further comprising:
    obtaining a list of records, wherein each record in the list of records comprises a corresponding telephone number; and
    selecting a particular record from the list of records, wherein the particular record comprises the telephone number.

3. The method of claim 2, wherein the particular record comprises a selected preference, wherein the selected preference is indicative of a preference for the voicemail message.

4. The method of claim 2, wherein the particular record comprises a selected preference, wherein the selected preference is indicative of a preference for a text message.

5. The method of claim 4, further comprising:
    determining a domain portion of an email address, wherein the domain portion is associated with the particular telecommunications service provider;
    generating an email address comprising the telephone number and the domain portion; and
    sending an email message to the email address, wherein the email message comprises content such that the particular telecommunications service provider is able to forward the email message to the telephone number as a text message.

6. The method of claim 1, further comprising determining the voicemail service is ready to record the voicemail message.

7. The method of claim 6, wherein determining the voicemail service is ready to record comprises detecting an audio output from the voicemail service, wherein the audio output is indicative of the voicemail service being ready to record.

8. A method, comprising:
    determining a particular telecommunications service provider associated with a telephone number;
    originating a call to the telephone number;
    in response to a voicemail service answering the call, determining a first probability that a desired outcome will occur in response to leaving a voicemail message with the telephone number and a second probability that the desired outcome will occur in response to sending a text message to the telephone number;
    in response to the first probability being greater than the second probability, performing a voicemail message process; and
    in response to the second probability being greater than the first probability, performing a text message process.

9. The method of claim 8, wherein the voicemail message process comprises:
    connecting an interactive voice response unit ("IVR") to the call;
    determining, by the IVR, one or more dual-tone multiple frequency ("DTMF") tones associated with the particular telecommunications service provider, wherein the one or more DTMF tones are used to terminate a greeting message provided by the voicemail service;
    providing the one or more DTMF tones to the voicemail service on the call to bypass the greeting message; and
    playing a voicemail message on the call.

10. The method of claim 9, further comprising determining the voicemail service is ready to record the voicemail message.

11. The method of claim 10, wherein determining the voicemail service is ready to record comprises detecting an audio output from the voicemail service, wherein the audio output is indicative of the voicemail service being ready to record.

12. The method of claim 8, wherein the text message process comprises:
    determining a domain portion of an email address, wherein the domain portion is associated with the particular telecommunications service provider;
    generating an email address comprising the telephone number and the domain portion; and
    sending an email message to the email address, wherein the email message comprises content such that the particular telecommunications service provider is able to forward the email message to the telephone number as a text message.

13. The method of claim 8, wherein determining the first and second probabilities comprises determining, based on a predictive model, the first and second probabilities.

14. The method of claim 8, further comprising:
    obtaining a list of records, wherein each record in the list of records comprises a corresponding telephone number; and
    selecting a particular record from the list of records, wherein the particular record comprises the telephone number.

15. A non-transitory computer readable medium, comprising computer instructions to cause at least one processor to:
    determine a particular telecommunications service provider associated with a telephone number;
    cause a call to be originated to the telephone number;
    in response to a voicemail service answering the call, determine a first probability that a desired outcome will occur in response to leaving a voicemail message with the telephone number and a second probability that the desired outcome will occur in response to sending a text message to the telephone number;
    in response to the first probability being greater than the second probability, perform a voicemail message process; and
    in response to the second probability being greater than the first probability, perform a text message process.

16. The non-transitory computer readable medium of claim 15, wherein the voicemail message process comprises computer instructions to cause the at least one processor to:
- connect an interactive voice response unit ("IVR") to the call;
- determine, by the IVR, one or more dual-tone multiple frequency ("DTMF") tones associated with the particular telecommunications service provider, wherein the one or more DTMF tones are used to terminate a greeting message provided by the voicemail service;
- cause the one or more DTMF tones to be provided to the voicemail service on the call to bypass the greeting message; and
- cause a voicemail message to be played on the call.

17. The non-transitory computer readable medium of claim 16, further comprising computer instructions to cause the at least one processor to determine the voicemail service is ready to record the voicemail message.

18. The non-transitory computer readable medium of claim 17, wherein the computer instructions to determine the voicemail service is ready to record comprise computer instructions to cause the at least one processor to detect an audio output from the voicemail service, wherein the audio output is indicative of the voicemail service being ready to record.

19. The non-transitory computer readable medium of claim 15, wherein the text message process comprises computer instructions to cause the at least one processor to:
- determine a domain portion of an email address, wherein the domain portion is associated with the particular telecommunications service provider;
- generate an email address comprising the telephone number and the domain portion; and
- cause an email message to be sent to the email address, wherein the email message comprises content such that the particular telecommunications service provider is able to forward the email message to the telephone number as a text message.

20. The non-transitory computer readable medium of claim 15, wherein the computer instructions to determine the first and second probabilities comprise computer instructions to cause the at least one processor to determine, based on a predictive model, the first and second probabilities.

21. The non-transitory computer readable medium of claim 15, further comprising computer instructions to cause the at least one processor to:
- obtain a list of records, wherein each record in the list of records comprises a corresponding telephone number; and
- select a particular record from the list of records, wherein the particular record comprises the telephone number.

* * * * *